United States Patent
Aoyama et al.

(10) Patent No.: US 10,340,089 B2
(45) Date of Patent: Jul. 2, 2019

(54) METHOD FOR PRODUCING ELECTROLYTIC CAPACITOR

(71) Applicant: Panasonic Intellectual Property Management Co., Ltd., Osaka (JP)

(72) Inventors: Tatsuji Aoyama, Yamaguchi (JP); Yukiya Shimoyama, Yamaguchi (JP); Junya Kushizaki, Yamaguchi (JP); Takuya Maruta, Yamaguchi (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 167 days.

(21) Appl. No.: 15/378,227

(22) Filed: Dec. 14, 2016

(65) Prior Publication Data

US 2017/0092427 A1   Mar. 30, 2017

Related U.S. Application Data

(63) Continuation of application No. PCT/JP2015/003212, filed on Jun. 26, 2015.

(30) Foreign Application Priority Data

Jul. 3, 2014  (JP) .................. 2014-137556

(51) Int. Cl.
*H01G 9/00* (2006.01)
*H01G 9/028* (2006.01)
(Continued)

(52) U.S. Cl.
CPC ............ *H01G 9/0029* (2013.01); *H01G 9/02* (2013.01); *H01G 9/028* (2013.01); *H01G 9/035* (2013.01); *H01G 9/07* (2013.01)

(58) Field of Classification Search
CPC .. H01G 9/0036; H01G 9/0032; H01G 9/0029; H01G 9/02; H01G 9/028; H01G 9/035; H01G 9/07
See application file for complete search history.

(56) References Cited

U.S. PATENT DOCUMENTS

2008/0002334 A1   1/2008   Kakuma et al.
2011/0119879 A1   5/2011   Ishimaru
(Continued)

FOREIGN PATENT DOCUMENTS

JP   2008-010657   1/2008
JP   2011-109024   6/2011
WO   2011/099261   8/2011

OTHER PUBLICATIONS

International Search Report of PCT application No. PCT/JP2015/003212 dated Sep. 1, 2015.

*Primary Examiner* — Seahvosh Nikmanesh
(74) *Attorney, Agent, or Firm* — McDermott Will & Emery LLP

(57) ABSTRACT

A method for producing an electrolytic capacitor according to the present disclosure includes a first step of preparing a capacitor element that includes an anode body having a dielectric layer; a second step of impregnating the capacitor element with a first treatment solution containing at least a conductive polymer and a first solvent; and a third step of impregnating, after the second step, the capacitor element, in which at least a part of the first solvent remains, with a second treatment solution containing a coagulant to coagulate the conductive polymer.

21 Claims, 1 Drawing Sheet

(51) Int. Cl.
*H01G 9/02* (2006.01)
*H01G 9/035* (2006.01)
*H01G 9/07* (2006.01)

(56) References Cited

U.S. PATENT DOCUMENTS

2011/0233450 A1* 9/2011 Nobuta .................. C08L 79/04
                                                          252/62.2
2012/0300368 A1   11/2012 Matsuura et al.

* cited by examiner

METHOD FOR PRODUCING ELECTROLYTIC CAPACITOR

BACKGROUND

1. Technical Field

The present disclosure relates to a method for producing an electrolytic capacitor, and, in more detail, relates to a method for producing an electrolytic capacitor having low equivalent series resistance (ESR) characteristics.

2. Description of the Related Art

Along with digitalization of electronic devices, compactification, large capacity, and low equivalent series resistance (ESR) in a high frequency range have been required of capacitors used in the electronic devices.

Promising candidates as small-sized, large capacity, and low ESR capacitors are electrolytic capacitors including as a cathode material a conductive polymer such as polypyrrole, polythiophene, polyfuran, or polyaniline. Proposed is, for example, an electrolytic capacitor including a dielectric layer-formed anode foil (anode body), and a conductive polymer layer as a cathode material, which is provided on the anode foil.

PTL 1 proposes a method for producing an electrolytic capacitor including a conductive solid layer and an electrolyte solution by impregnating a separator-equipped element with a conductive polymer dispersion to form a conductive solid layer, followed by impregnation with the electrolyte solution.

CITATION LIST

Patent Literature

PTL 1; Unexamined Japanese Patent Publication No. 2008-010657

SUMMARY

Technical Problem

In recent years, however, further reduction in the ESR has been required. It is difficult in some cases to reduce the ESR depending on conditions for forming a conductive solid layer including a conductive polymer.

Solution to Problem

One aspect of the present disclosure relates to a method for producing an electrolytic capacitor, the method including a first step of preparing a capacitor element that includes an anode body having a dielectric layer; a second step of impregnating the capacitor element with a first treatment solution containing at least a conductive polymer and a first solvent; and a third step of impregnating, after the second step, the capacitor element, in which at least a part of the first solvent remains, with a second treatment solution containing a coagulant to coagulate the conductive polymer.

Advantageous Effect of Invention

According to the present disclosure, there can be provided an electrolytic capacitor in which the ESR is reduced.

DETAILED DESCRIPTION

Hereinafter, an exemplary embodiment of a method for producing an electrolytic capacitor according to the present disclosure is described with appropriate reference to drawings. The exemplary embodiment below, however, is not for limiting the present disclosure.

<<Electrolytic Capacitor>>

Figure 1:
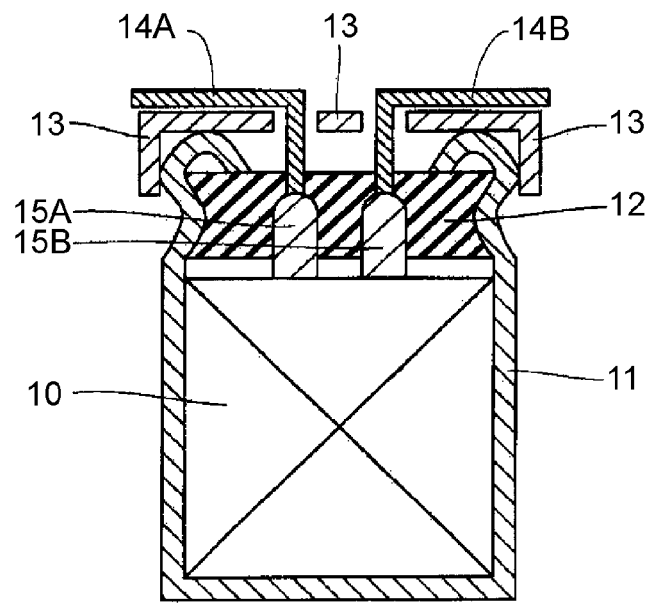
FIG. 1 is a schematic sectional view of an electrolytic capacitor obtained by a production method according to an exemplary embodiment of the present disclosure.
Figure 2:
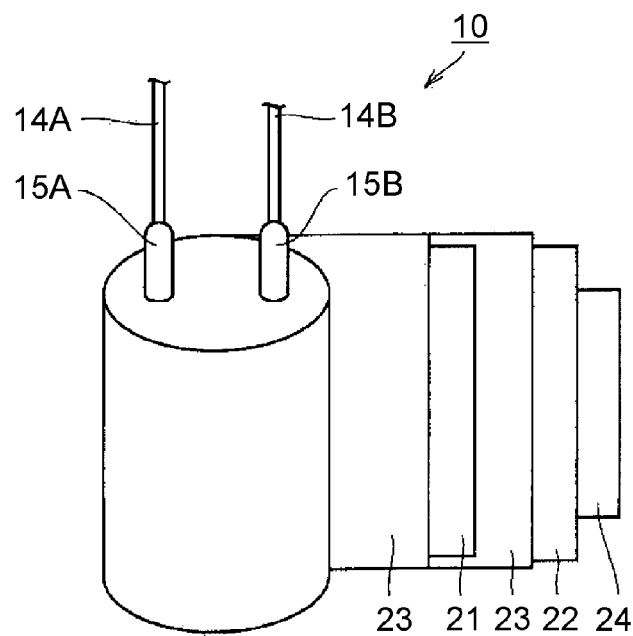
FIG. 2 is a schematic view illustrating a configuration of a capacitor element of the electrolytic capacitor in FIG. 1.

FIG. 1 is a schematic sectional view of an electrolytic capacitor obtained by a production method according to an exemplary embodiment of the present disclosure. FIG. 2 is a schematic view of a partially developed capacitor element of the same electrolytic capacitor.

In FIG. 1, the electrolytic capacitor includes capacitor element 10 having anode body 21 on which a dielectric layer is formed; and a conductive polymer (not shown) covering at least a part of a surface (or attached to at least a part of a surface) of the dielectric layer. Capacitor element 10 is housed in an outer case in a state in which at least a part of the surface of the dielectric layer is covered with the conductive polymer. The outer case includes bottomed case 11 in which capacitor element 10 is housed, insulating sealing member 12 that seals an opening of bottomed case 11, and base plate 13 that covers sealing member 12. Bottomed case 11 is, at a part near an opening end, processed inward by drawing, and is, at the opening end, swaged to sealing member 12 for curling.

For example, capacitor element 10 as shown in FIG. 2 is called a wound body. Capacitor element 10 includes anode body 21 connected to lead tab 15A, cathode body 22 connected to lead tab 15B, and separator 23. Anode body 21 and cathode body 22 are wound with separator 23 interposed between the anode body and the cathode body. An outermost periphery of capacitor element 10 is fixed with fastening tape 24. FIG. 2 shows partially developed capacitor element 10 before the outermost periphery of the capacitor element is fixed.

Anode body 21 includes a metal foil whose surface is roughened so as to include projections and recesses, and a dielectric layer is formed on the metal foil having the projections and recesses.

In the electrolytic capacitor, the conductive polymer is attached so as to cover at least a part of the surface of the dielectric layer formed on anode body 21. The attachment, however, is not limited to this case, and the conductive polymer may be attached to any position between anode body 21 and cathode body 22. For example, the conductive polymer covers at least a part of the surface of the dielectric layer formed on anode body 21, and may further cover at least a part of a surface of cathode body 22 and/or at least a part of a surface of separator 23. In the electrolytic capacitor, the conductive polymer that covers at least a part of the surface of, for example, the anode body, the cathode body, and the separator (specifically, a film including the conductive polymer) is generally referred to as a conductive polymer layer in some cases.

The electrolytic capacitor may further include an electrolyte solution. In this case, the electrolyte solution is housed in the outer case (specifically, bottomed case 11) together with capacitor element 10 in which at least a part of the surface of the dielectric layer is covered with the conductive polymer.

<<Method for Producing Electrolytic Capacitor>>

Hereinafter, an example of the method for producing an electrolytic capacitor according to the exemplary embodiment of the present disclosure is described according to each of steps.

(i) Step of Preparing Capacitor Element 10 (First Step)

(i-1) Step of Preparing Anode Body 21 Having Dielectric Layer

First, a raw material of anode body 21, i.e. a metal foil is prepared. A type of the metal is not particularly limited, but it is preferable to use a valve action metal such as aluminum, tantalum, or niobium, or an alloy including a valve action metal, from the viewpoint of facilitating formation of the dielectric layer.

Next, a surface of the metal foil is roughened. By the roughening, a plurality of projections and recesses are formed on the surface of the metal foil. The roughening is preferably performed by etching the metal foil. The etching may be performed by, for example, a DC electrolytic method or an AC electrolytic method.

Next, a dielectric layer is formed on the roughened surface of the metal foil. A method for forming the dielectric layer is not particularly limited, and the dielectric layer can be formed by subjecting the metal foil to a chemical conversion treatment. The chemical conversion treatment may be performed by, for example, immersing the metal foil in a chemical conversion solution such as an ammonium adipate solution. In the chemical conversion treatment, a voltage may be applied in a state in which the metal foil is immersed in the chemical conversion solution, as necessary.

Normally, a large metal foil formed of, for example, a valve action metal is subjected to a roughening treatment and a chemical conversion treatment from the viewpoint of mass productivity. In this case, the treated foil is cut into a desired size to prepare anode body 21.

(i-2) Step of Preparing Cathode Body 22

A metal foil may also be used for cathode body 22 as with the anode body. A type of the metal is not particularly limited, but it is preferable to use a valve action metal such as aluminum, tantalum, or niobium, or an alloy including a valve action metal. A surface of the metal foil may be roughened as necessary.

Further, on the surface of cathode body 22 may be provided a chemical conversion film, a film of a metal different from the metal that constitutes the cathode body (different type of metal), or a nonmetal film. Examples of the different type of metal and the nonmetal include metals such as titanium and nonmetals such as carbon, respectively.

(i-3) Step of Manufacturing Capacitor Element 10 (Wound Body)

Next, capacitor element 10 is manufactured with anode body 21 and cathode body 22. The capacitor element can be obtained by stacking anode body 21 and cathode body 22 with separator 23 interposed between the anode body and the cathode body. Anode body 21 and cathode body 22 may be wound with the separator interposed between the anode body and the cathode body to form a wound body as shown in FIG. 2. At this time, the winding may be conducted while lead tabs 15A, 15B are rolled in the anode body, the cathode body and the separator, to cause lead tabs 15A, 15B to stand up from the wound body as shown in FIG. 2.

As separator 23, for example, a nonwoven fabric may be used, which includes a fiber of, for example, cellulose, polyethylene terephthalate, a vinylon, or a polyamide (e.g., an aliphatic polyamide and an aromatic polyamide such as aramid).

A material for lead tabs 15A, 15B is not particularly limited as long as the material is a conductive material. Surfaces of lead tabs 15A, 15B may be subjected to a chemical conversion treatment. Further, lead tabs 15A, 15B may be covered with a resin at a part in contact with sealing member 12 and a part connected to lead wires 14A, 14B.

A material for lead wires 14A, 14B connected to lead tabs 15A, 15B, respectively, is not also particularly limited, and, for example, a conductive material may be used.

Then, fastening tape 24 is disposed on an end of an outer surface of anode body 21, cathode body 22 or separator 23, which is positioned at an outermost layer of the wound body (cathode body 22 in FIG. 2), to fix the end with fastening tape 24. When anode body 21 is prepared by cutting a large metal foil, the capacitor element in a state of, for example, a wound body, may further be subjected to a chemical conversion treatment in order to provide a dielectric layer on a cut surface of anode body 21.

(ii) Step of Impregnating Capacitor Element (Wound Body) 10 with First Treatment Solution (Second Step)

Next, capacitor element 10 is impregnated with a first treatment solution.

Impregnating capacitor element 10 with the first treatment solution is not particularly limited as long as the first treatment solution can be applied to at least the anode body (particularly, at least the dielectric layer). For example, the capacitor element may be immersed in the first treatment solution, or the first treatment solution may be injected into the capacitor element. The impregnation may be conducted under atmospheric pressure, but can also be conducted in an atmosphere under a reduced pressure ranging, for example, from 10 kPa to 100 kPa, preferably from 40 kPa to 100 kPa. The impregnation may also be conducted under ultrasonic vibration as necessary. An impregnation period depends on a size of capacitor element 10, but ranges, for example, from 1 second to 5 hours, preferably from 1 minute to 30 minutes. By this step, the first treatment solution is applied to capacitor element 10.

Examples of the conductive polymer include polypyrrole, polythiophene, polyfuran, polyaniline, polyacetylene, polyphenylene, polyphenylene vinylene, polyacene, and polythiophene vinylene. A single one or two or more in combination of these conductive polymers may be used, or a copolymer of two or more monomers may also be used.

In the present disclosure, polypyrrole, polythiophene, polyfuran, polyaniline, and the like mean polymers having, as a basic skeleton, polypyrrole, polythiophene, polyfuran, polyaniline, and the like, respectively. Therefore, polypyrrole, polythiophene, polyfuran, polyaniline, and the like also include their derivatives. For example, polythiophene includes poly(3,4-ethylene dioxythiophene) and the like.

The conductive polymer may include a dopant. As the dopant, a polyanion can be used. Specific examples of the polyanion include polyvinylsulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. Especially, a polyanion derived from polystyrenesulfonic acid is preferable. A single one or two or more in combination of these polyanions may be used. These polyanions may be a polymer of a single monomer or a copolymer of two or more monomers.

A weight average molecular weight of the polyanion is not particularly limited, and ranges, for example, from 1,000 to 1,000,000. A conductive polymer including such a polyanion is easily and uniformly dispersed in a liquid solvent containing a first solvent, facilitating uniform attachment of the conductive polymer to the surface of the dielectric layer.

The first treatment solution is sufficient as long as the first treatment solution contains at least the conductive polymer and a liquid solvent containing the first solvent. Further, the first treatment solution may be either a solution obtained by dissolving the conductive polymer in a liquid solvent or a dispersion liquid obtained by dispersing the conductive polymer in a liquid solvent. In the dispersion liquid, the conductive polymer is, in a state of particles, dispersed in the liquid solvent. Used as the dispersion liquid may be one obtained by polymerizing, in a liquid solvent, a raw material of the conductive polymer (e.g., a precursor such as a monomer and/or an oligomer of the conductive polymer) in the presence of a dopant to generate particles of the conductive polymer including the dopant. Alternatively, used as the dispersion liquid may also be one obtained by polymerizing, in a liquid solvent, a raw material of the conductive polymer to generate particles of the conductive polymer, or one obtained by dispersing in a liquid solvent particles of the conductive polymer synthesized in advance.

The liquid solvent of the first treatment solution is sufficient as long as the liquid solvent contains at least the first solvent, and the liquid solvent may contain a solvent other than the first solvent. The liquid solvent contained in the first treatment solution may contain a plurality of different first solvents. The first solvent may account for, for example, 30% by mass or more, preferably 50% by mass or more, more preferably 70% by mass or more of the liquid solvent in the first treatment solution.

The first solvent is not particularly limited, and may be water or a nonaqueous solvent. The nonaqueous solvent is a collective term for liquids except water and liquids containing water, and includes an organic solvent and an ionic liquid. As the first solvent, a polar solvent is especially preferable. The polar solvent may be a protic solvent or an aprotic solvent.

Examples of the protic solvent include alcohols such as methanol, ethanol, propanol, butanol, ethylene glycol (EG), propylene glycol (PG), polyethylene glycol (PEG), diethylene glycol monobutyl ether, glycerin, 1-propanol, butanol, and polyglycerin, formaldehyde, and water. Examples of the aprotic solvent include amides such as N-methylacetamide, N,N-dimethylformamide, and N-methyl-2-pyrrolidone; esters such as methyl acetate; ketones such as methyl ethyl ketone and γ-butyrolactone (γBL); ethers such as 1,4-dioxane; sulfur-containing compounds such as dimethylsulfoxide and sulfolane (SL); and carbonate compounds such as propylene carbonate.

As the first solvent, a protic solvent is especially preferable. Particularly, the first solvent is preferably water. In this case, handleability of the first treatment solution and dispersibility of the conductive polymer are improved. Further, low-viscosity water is expected to improve contact between the conductive polymer and a coagulant in a following third step. When the first solvent is water, water accounts for preferably 50% by mass or more, further preferably 70% by mass or more, particularly preferably 90% by mass or more of the liquid solvent in the first treatment solution.

Particles of the conductive polymer dispersed in the dispersion liquid preferably have a median diameter ranging from 0.01 μm to 0.5 μm in a volume particle size distribution obtained by measurement with a particle diameter measuring apparatus according to dynamic light scattering (hereinafter, simply referred to as a median diameter according to dynamic light scattering). A particle diameter of the conductive polymer can be adjusted by, for example, polymerization conditions and dispersion conditions.

Concentration of the conductive polymer (including a dopant, or a polyanion) in the first treatment solution preferably ranges from 0.5% by mass to 10% by mass. The first treatment solution having such a concentration is suitable for attachment of an appropriate amount of the conductive polymer and is easily impregnated into capacitor element 10 to give advantages for improvement of productivity.

Although a liquid solvent such as the first solvent can be removed as necessary after the second step, it is important to subject the capacitor element (particularly, the anode body), in which at least a part of the liquid solvent remains, to the third step. When a liquid solvent is removed after the second step, the liquid solvent may be removed by vaporization under heating, or may be removed under reduced pressure as necessary. When a liquid solvent is removed after the second step, it is desirable to adjust a removal amount so that a remaining amount of the liquid solvent after the removal is in a range described later.

(iii) Step of Coagulating Conductive Polymer (Third Step)

In a third step, the capacitor element to which the first treatment solution has been applied is impregnated with a second treatment solution containing a coagulant to coagulate the conductive polymer.

In the capacitor element to be subjected to the third step, the remaining amount of the liquid solvent is preferably 5% by mass or more (e.g., 5% by mass to 100% by mass), more preferably 20% by mass or more (e.g., 20% by mass to 100% by mass) or 50% by mass or more (e.g., 50% by mass to 100% by mass). When the remaining amount of the liquid solvent is in such a range, the coagulant easily permeates the conductive polymer (specifically, between particles of the conductive polymer) in the third step, more facilitating uniform attachment of the conductive polymer to the surface of the dielectric layer. Accordingly, an effect of reducing an ESR value can be further increased.

The remaining amount of the liquid solvent indicates a ratio (% by mass) of a mass of the liquid solvent included in the capacitor element to be subjected to the third step to a mass of the liquid solvent contained in the first treatment solution with which the capacitor element has been impregnated in the second step.

In the third step, it is important to coagulate the conductive polymer by impregnating with the second treatment solution the capacitor element (particularly, the anode body) in which at least a part of the first solvent remains. The coagulant is lower in affinity for the conductive polymer than the first solvent, making particles of the conductive polymer easily coagulate. Coagulation of particles of the conductive polymer increases conductivity so that the ESR can be reduced. Such an effect is easily obtained particularly when the impregnation is conducted in a state in which at least water remains Therefore, it is preferable to use a liquid solvent containing at least water as the first solvent in the first treatment solution. Use of a liquid solvent containing water as the first solvent increases stability of the first treatment solution so that use of this liquid solvent is advantageous also from such a viewpoint.

In the present disclosure, 1000 parts by mass of a substance relative to 100 parts by mass of the conductive polymer are added to a solution or dispersion liquid containing the conductive polymer, measurement is conducted for obtaining an addition initial viscosity η1 and a viscosity η2 18 hours after the addition at room temperature, and a substance that has an η2 1.5 times or more an η1 is defined as the coagulant. The viscosity can be measured with a vibration-type viscometer (e.g., VISCOMATE VM-100A manufactured by SEKONIC CORPORATION).

A boiling point of the coagulant is preferably higher than a boiling point of the first solvent. A difference between the boiling point of the coagulant and the boiling point of the first solvent ranges, for example from 20° C. to 200° C., preferably from 50° C. to 150° C.

As the coagulant, it is preferable to use, for example, a liquid that is blended with a liquid solvent contained in the first treatment solution and is lower in affinity for the conductive polymer than the liquid solvent. Here, the liquid that is blended with a liquid solvent means a liquid that is capable of mixing with the liquid solvent to make a uniform state. The coagulant is preferably aprotic. As the aprotic coagulant, there can be used, for example, various compounds generally referred to as aprotic solvents. Especially, a polar compound, i.e., an aprotic polar solvent is preferable.

Examples of such a coagulant include cyclic compounds having an oxo group (=O) as a substituent, cyclic compounds having a carbonyl group (>C=O) as a ring-constitutional unit (e.g., a lactone, a cyclic ketone, a cyclic carbonate, and a lactam), and cyclic compounds having a sulfonyl group (>S(=O)2) as a ring-constitutional unit (i.e., a cyclic sulfone). For example, a ring that constitutes a cyclic compound is preferably a 4- to 8-membered ring, more preferably a 4- to 6-membered ring. The cyclic compound may have a substituent [an alkyl group (e.g., a C1-4 alkyl group) such as a methyl group] on the ring. A single one or two or more in combination of the coagulants can be used.

Examples of the lactone include γ-butyrolactone, γ-valerolactone, and δ-valerolactone. Examples of the cyclic ketone include saturated cyclic ketones such as cyclohexanone, and unsaturated cyclic ketones such as cyclohexanone and isophorone. Examples of the cyclic carbonate include saturated cyclic carbonates such as ethylene carbonate and propylene carbonate, and unsaturated cyclic carbonates such as vinylene carbonate. Examples of the lactam include γ-butyrolactam, N-methyl-2-pyrrolidone, δ-valerolactam, and ε-caprolactam. Examples of the cyclic sulfone include a sultone and an alkylene sulfone. Examples of the sultone include 1,3-propanesultone, 1,4-butanesultone, 1,5-pentanesultone, and 2,5-pentanesultone. Examples of the alkylene sulfone include sulfolane and 3-methylsulfolane.

A mass of the coagulant with which the capacitor element is impregnated ranges preferably from 2 to 100 times, further preferably from 3 to 80 times a mass of the conductive polymer with which the capacitor element has been impregnated. A mass ratio in such a range facilitates acquisition of an effect of coagulating the conductive polymer, further increasing an effect of densifying the conductive polymer attached to, for example, the surface of the dielectric layer. Accordingly, the effect of reducing the ESR is easily obtained.

The second treatment solution may further contain, for example, a solvent and/or an additive as necessary. When an amount of the coagulant in the second treatment solution is too small, it is sometimes difficult to obtain the effect of coagulation by the coagulant. The second treatment solution preferably has a coagulation action as a whole. Therefore, a ratio of the coagulant in the second treatment solution ranges, for example, from 50% by mass to 100% by mass, preferably from 70% by mass to 100% by mass or from 85% by mass to 100% by mass.

Examples of the solvent, other than the coagulant, added to the second treatment solution include the nonaqueous solvents exemplified as the first solvent in the first treatment solution, polyols (e.g., aliphatic polyols) having 3 or more hydroxyl groups, such as glycerin and polyglycerin, a monoalkyl ether of an alkylene glycol (or a polyalkylene glycol), such as diethylene glycol monobutyl ether, and a chain sulfone such as dimethyl sulfoxide. A single one or two or more in combination of these solvents can be used as the solvent added to the second treatment solution. As the solvent added to the second treatment solution, protic organic solvents such as alcohols and polyols are preferable, and especially, polyethylene glycol is preferable.

(iv) Step of Removing Solvent Component (Fourth Step)

After the third step, a solvent component that remains in the capacitor element can be removed in a fourth step. In the fourth step, removal of at least a part of the solvent component is sufficient, or the solvent component may entirely be removed. The removal of the solvent component in the fourth step enables further coagulation of the conductive polymer, more densifying film quality.

The solvent component mentioned herein refers to a liquid solvent contained in the first treatment solution, and the coagulant and a solvent other than the coagulant contained in the second treatment solution.

In the fourth step, the solvent component can be removed by vaporization under heating, may be removed under atmospheric pressure, or may be removed under reduced pressure as necessary. A temperature during the removal of the solvent component may range, for example, from 40° C. to 250° C. The temperature during the removal of the solvent component may be higher than a boiling point of the first solvent, and less than a boiling point of the coagulant. The removal of the solvent component may be conducted, for example, by a plurality of stages (e.g., at least two stages) having different temperatures, or while the temperature is raised.

Thus, conductive polymer-attached capacitor element 10 is manufactured, in which the conductive polymer is attached to between anode body 21 and cathode body 22 (particularly, the surface of the dielectric layer). The conductive polymer attached to the surface of the dielectric layer substantially functions as a cathode material.

The conductive polymer is preferably attached so as to cover at least a part of the surface of the dielectric layer. The conductive polymer may be attached not only to the surface of the dielectric layer, but also to the surface of cathode body 22 and/or separator 23. At least one step may be repeated two or more times as necessary, which is selected from the group consisting of the second step (ii) of impregnating with the first treatment solution capacitor element 10 that includes anode body 21 having the dielectric layer; the step (optional step) of removing a liquid solvent after the second step; the third step (iii) of coagulating the conductive polymer; and the fourth step (iv) (optional step) of removing a solvent component. Steps selected from these steps set as a series of steps may be repeated two or more times. For example, after repetition of the second step a plurality of times, another step may be conducted, or the second step, the step of removing a liquid solvent as necessary, and the third step set as a series of steps may be repeated a plurality of times. It is advantageous to repeat at least the first step a plurality of times from the viewpoint of increasing coverage of the conductive polymer on the dielectric layer.

The solvent component may be entirely removed from capacitor element 10 obtained in the third or fourth step. Alternatively, in capacitor element 10 obtained in the third or fourth step, the solvent component may remain. When the solvent component remains, a restoration function of the dielectric layer can be improved, further increasing the effect of reducing the ESR. Further, the remaining solvent component exists between particles of the conductive polymer, facilitating permeation of an electrolyte solution between particles of the conductive polymer when the capacitor element is impregnated with the electrolyte solution in the fifth step. Accordingly, the restoration function of the dielectric layer by the electrolyte solution is easily obtained.

(v) Step of Impregnating Capacitor Element 10 (Wound Body) with Electrolyte Solution (Fifth Step)

In a fifth step, capacitor element 10 can further be impregnated with an electrolyte solution after the third step. The fifth step is not particularly limited as long as the fifth step is conducted after the third step. The fifth step may be conducted consecutively after the third step, or may be conducted after another step (e.g., the fourth step) following the third step. The fifth step is not necessarily needed, however, impregnation with the electrolyte solution can improve the restoration function of the dielectric layer, further increasing the effect of reducing the ESR.

As the electrolyte solution, a nonaqueous solvent may be used, or a solution may also be used, which contains a nonaqueous solvent and an ionic substance (solute) dissolved in the nonaqueous solvent. As the nonaqueous solvent, an organic solvent or an ionic liquid may be used. As the nonaqueous solvent, a high boiling point nonaqueous solvent is desirable, and as the high boiling point nonaqueous solvent, there can be used an ionic liquid and/or a high boiling point organic solvent. A boiling point of the nonaqueous solvent is for example, higher than 100° C., preferably 150° C. or higher, further preferably 200° C. or higher. Examples of the organic solvent include the organic solvents exemplified for the first solvent in the first treatment solution, the cyclic compounds having an oxo group as a substituent, exemplified for the coagulant, and the solvents exemplified for the second treatment solution. A single one or two or more in combination of the nonaqueous solvents can be used.

Among the nonaqueous solvents, preferable are alkylene glycols such as EG and PG, PEG, glycerin (e.g., glycerin and polyglycerin), a lactone, a cyclic sulfone, formaldehyde, ethers, amides, esters and ketones. Especially, polyethylene glycol and/or glycerin is preferable, for example.

As the solute, a salt of an anion and a cation is used, and an organic salt is preferable, in which at least one of the anion and the cation is an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2-ethylimidazolinium phthalate. A single one or two or more in combination of the solutes may be used.

The impregnation of capacitor element 10 with the electrolyte solution is not particularly limited, and can be conducted by a known method. For example, the capacitor element may be immersed in the electrolyte solution, or the electrolyte solution may be injected into a container housing capacitor element 10. The impregnation of capacitor element 10 with the electrolyte solution may be conducted under reduced pressure (e.g., 10 kPa to 100 kPa) as necessary.

(vi) Step of Encapsulating Capacitor Element 10 (Wound Body)

Next, capacitor element 10 is encapsulated. Specifically, first, capacitor element 10 is housed in bottomed case 11 so that lead wires 14A, 14B are positioned on an open upper surface of bottomed case 11. As a material for bottomed case 11, there can be used metals such as aluminum, stainless steel, copper, iron and brass, or an alloy of these metals.

Next, sealing member 12 formed so as to allow lead wires 14A, 14B to penetrate the sealing member is disposed above capacitor element 10 to encapsulate capacitor element 10 in bottomed case 11. Sealing member 12 is sufficient as long as the sealing member is an insulating substance. As the insulating substance, an elastic body is preferable, and for example, high heat resistance silicone rubber, fluororubber, ethylene propylene rubber, Hypalon rubber, butyl rubber or isoprene rubber is especially preferable.

Next, bottomed case 11 is, at a part near an opening end, processed by transverse drawing, and is, at the opening end, swaged to sealing member 12 for curling. Then, base plate 13 is disposed on a curled part of the bottomed case to complete the electrolytic capacitor as shown in FIG. 1. Subsequently, an aging treatment may be performed while a rated voltage is applied.

In the exemplary embodiment described above, a wound electrolytic capacitor has been described. The application range of the present disclosure, however, is not limited to the wound electrolytic capacitor, and can be applied to other electrolytic capacitors such as a chip electrolytic capacitor including a metal sintered body as an anode body, and a laminated electrolytic capacitor including a metal plate as an anode body.

EXAMPLES

Hereinafter, the present disclosure is specifically described with reference to examples and comparative examples. The present disclosure, however, is not limited to the examples below.

Example 1

A wound electrolytic capacitor (diameter: 6.3 mm, length: 5.8 mm) having a rated voltage of 35 V and a rated electrostatic capacity of 47 µF, as shown in FIG. 1, was manufactured in the following procedure, and evaluation for the electrolytic capacitor was conducted.

(1) Production of Electrolytic Capacitor (Preparation of Anode Body Having Dielectric Layer)

A 100-µm-thick aluminum foil was subjected to etching to roughen a surface of the aluminum foil. Then, a dielectric layer was formed on the surface of the aluminum foil by a chemical conversion treatment with an ammonium adipate aqueous solution to prepare an anode body having the dielectric layer.

(Preparation of Cathode Body)

A 50-µm-thick aluminum foil was subjected to etching to roughen a surface of the aluminum foil to prepare a cathode body.

(Manufacture of Capacitor Element (Wound Body))

An anode lead tab and a cathode lead tab were connected to the anode body and the cathode body, respectively, and the anode body and the cathode body were would with a separator interposed between the anode body and the cathode body while the lead tabs were rolled in the anode body, the cathode body and the separator, to give a capacitor element. Ends of the lead tabs protruding from the capacitor element were connected to an anode lead wire and a cathode lead wire, respectively. Then, the manufactured capacitor element was subjected to a chemical conversion treatment again to form a dielectric layer at a cut end of the anode body. Next, an end of an outer surface of the capacitor element was fixed with a fastening tape.

(Impregnation with First Treatment Solution)

A mixed solution was prepared by dissolving 3,4-ethylene dioxythiophene and dopant polystyrenesulfonic acid in ion-exchanged water (first solvent). An oxidant (ferric sulfate and sodium persulfate) dissolved in ion-exchanged water was added to the resultant mixed solution while the mixed solution was stirred, to cause a polymerization reaction. After the reaction, the resultant reaction solution was dialyzed to remove unreacted monomers and an excessive oxidant so that a first treatment solution was obtained, which included a dispersion liquid containing about 5% by mass of polyethylene dioxythiophene doped with polystyrenesulfonic acid.

Then, the capacitor element was impregnated with the resultant first treatment solution for 5 minutes.

(Impregnation with Second Treatment Solution)

Next, the capacitor element was impregnated with a second treatment solution. As a coagulant contained in the second treatment solution, γ-butyrolactone was used. A remaining amount of a solvent component (first solvent (water)) in the capacitor element was about 100% by mass in a stage prior to impregnation with the second treatment solution. A mass of the coagulant with which the capacitor element was impregnated was 5 times a mass of the conductive polymer with which the capacitor element had been impregnated.

Next, the capacitor element was heated at 150° C. for 20 minutes to remove the solvent component.

Thus, a conductive polymer-attached capacitor element was manufactured.

(Impregnation with Electrolyte Solution)

Next, the capacitor element was impregnated with an electrolyte solution under reduced pressure. Used as the electrolyte solution was a solution obtained by mixing PEG, γBL, SL, and mono(ethyldimethylamine) phthalate (solute) in a mass ratio of 25:25:25:25.

(Encapsulation of Capacitor Element)

The electrolyte solution-impregnated capacitor element was housed in an outer case as shown in FIG. 1 and encapsulated to manufacture an electrolytic capacitor. A total of 300 electrolytic capacitors were manufactured in the same manner.

(2) Evaluation of Performance

Electrostatic capacity (μF) was measured as initial characteristics of the electrolytic capacitor. Specifically, initial electrostatic capacity (μF) at a frequency of 120 Hz was measured for the electrolytic capacitor with an LCR meter for 4-terminal measurement.

An ESR value (mΩ) was also measured as initial characteristics of the electrolytic capacitor. Specifically, the ESR value (mΩ) at a frequency of 100 kHz was measured for the electrolytic capacitor with an LCR meter for 4-terminal measurement.

The initial electrostatic capacity and the ESR value were measured for randomly selected 120 electrolytic capacitors, and average values for the initial electrostatic capacity and the ESR value were calculated, respectively.

Comparative Example 1

An electrolytic capacitor was manufactured in the same manner as in Example 1 except that the capacitor element that was impregnated with the first treatment solution was heated at 150° C. for 30 minutes to remove the solvent component, without impregnation with the second treatment solution, and the evaluation of performance was conducted for the resultant electrolytic capacitor.

Comparative Example 2

An electrolytic capacitor was manufactured in the same manner as in Example 1 except that the capacitor element that was impregnated with the first treatment solution was heated at 150° C. for 30 minutes to completely remove the solvent component (an remaining amount of the solvent component in the capacitor element: 0% by mass), and the evaluation of performance was conducted for the resultant electrolytic capacitor.

Comparative Example 3

An electrolytic capacitor was manufactured in the same manner as in Example 1 except that polyethylene glycol was used in place of γ-butyrolactone as the second treatment solution, and the evaluation of performance was conducted for the resultant electrolytic capacitor.

Example 2

An electrolytic capacitor was manufactured in the same manner as in Example 1 except that sulfolane was used in place of γ-butyrolactone as the second treatment solution, and the evaluation of performance was conducted for the resultant electrolytic capacitor.

Example 3

An electrolytic capacitor was manufactured in the same manner as in Example 1 except that 1-methyl-2-pyrrolidone was used in place of γ-butyrolactone as the second treatment solution, and the evaluation of performance was conducted for the resultant electrolytic capacitor.

Example 4

An electrolytic capacitor was manufactured in the same manner as in Example 1 except that diethylene glycol dimethyl ether was used in place of γ-butyrolactone as the second treatment solution, and the evaluation of performance was conducted for the resultant electrolytic capacitor.

Example 5

An electrolytic capacitor was manufactured in the same manner as in Example 1 except that 1-butanol was used in place of γ-butyrolactone as the second treatment solution, and the evaluation of performance was conducted for the resultant electrolytic capacitor.

Example 6

An electrolytic capacitor was manufactured in the same manner as in Example 1 except that a liquid mixture containing γ-butyrolactone (coagulant) and polyethylene glycol in a mass ratio of 75:25 was used in place of γ-butyrolactone as the second treatment solution, and the evaluation of performance was conducted for the resultant electrolytic capacitor. The mass of the coagulant with which the capacitor element was impregnated was 3.75 times the mass of the conductive polymer with which the capacitor element had been impregnated.

Example 7

An electrolytic capacitor was manufactured in the same manner as in Example 1 except that a liquid mixture containing γ-butyrolactone (coagulant) and polyethylene glycol in a mass ratio of 50:50 was used in place of γ-butyrolactone as the second treatment solution, and the evaluation of performance was conducted for the resultant electrolytic capacitor. The mass of the coagulant with which the capacitor element was impregnated was 2.5 times the mass of the conductive polymer with which the capacitor element had been impregnated.

Example 8

An electrolytic capacitor was manufactured in the same manner as in Example 1 except that a liquid mixture containing γ-butyrolactone (coagulant) and polyethylene glycol in a mass ratio of 25:75 was used in place of γ-butyrolactone as the second treatment solution, and the evaluation of performance was conducted for the resultant electrolytic capacitor. The mass of the coagulant with which the capacitor element was impregnated was 1.25 times the mass of the conductive polymer with which the capacitor element had been impregnated.

Table 1 shows results of Examples and Comparative Examples. Table 1 also shows constituents of the second treatment solution.

To the dispersion liquid, which contained polyethylene dioxythiophene doped with polystyrenesulfonic acid, used in the present examples, were added 1000 parts by mass of γ-butyrolactone relative to 100 parts by mass of the conductive polymer, and an addition initial viscosity η1 and a viscosity η2 18 hours after the addition were measured at room temperature to find that the η2 was 1.5 times or more the η1. In addition, the η2 was 1.5 times or more the also in the cases of sulfolane, 1-methyl-2-pyrrolidone, diethylene glycol dimethyl ether, and butanol. On the other hand, the η2 was less than 1.5 times the η1 in the case of polyethylene glycol as a result of conducting the same measurement.

TABLE 1

| | Second treatment solution | Electrostatic capacity/μF | ESR/mΩ |
|---|---|---|---|
| Example 1 | γ-Butyrolactone | 41.2 | 23.2 |
| Example 2 | Sulfolane | 41.8 | 24.3 |
| Example 3 | 1-Methyl-2-pyrrolidone | 41.0 | 25.2 |
| Example 4 | Diethylene glycol dimethyl ether | 41.5 | 25.5 |
| Example 5 | 1-Butanol | 41.3 | 25.1 |
| Comparative Example 1 | — | 27.5 | 64.3 |
| Comparative Example 2 | γ-Butyrolactone | 29.8 | 55.4 |
| Comparative Example 3 | Polyethylene glycol | 41.5 | 67.2 |
| Example 6 | γ-Butyrolactone (75) + Polyethylene glycol (25) | 41.6 | 24.2 |
| Example 7 | γ-Butyrolactone (50) + Polyethylene glycol (50) | 41.4 | 25.8 |
| Example 8 | γ-Butyrolactone (25) + Polyethylene glycol (75) | 41.6 | 35.2 |

As shown in Table 1, the ESR value was low and a large electrostatic capacity was obtained in Example 1. In contrast, when the capacitor element was not impregnated with the second treatment solution, the ESR was very high and the electrostatic capacity was low (Comparative Example 1). When the first solvent did not remain in the impregnation of the capacitor element with the second treatment solution, an effect of reducing the ESR was hardly obtained and the electrostatic capacity was hardly different from the electrostatic capacity in Comparative Example 1 in spite of the impregnation with the second treatment solution (Comparative Example 2). In Comparative Example 3 in which polyethylene glycol was used in place of the coagulant, the electrostatic capacity was improved while the ESR was larger than the ESR in Comparative Example 1.

Also in Examples 2 to 5 in which other coagulants were used in place of γ-butyrolactone, the ESR value was low and the electrostatic capacity was large as in Example 1.

Also when the second treatment solution containing polyethylene glycol in addition to γ-butyrolactone was used, the ESR was reduced and a large electrostatic capacity was obtained.

The present disclosure can be used for electrolytic capacitors including a conductive polymer as a cathode material.

What is claimed is:

1. A method for producing an electrolytic capacitor, the method comprising:
   a first step of preparing a capacitor element that includes an anode body having a dielectric layer;
   a second step of impregnating the capacitor element with a first treatment solution containing at least a conductive polymer and a liquid solvent including a first solvent; and
   a third step of impregnating, after the second step, the capacitor element, in which at least a part of the first solvent remains, with a second treatment solution containing a coagulant to coagulate the conductive polymer,
   wherein a remaining amount of the liquid solvent in the capacitor element to be subjected to the third step is 5% by mass or more relative to a mass of the of the liquid solvent contained in the first treatment solution impregnated into the capacitor element in the second step.

2. The method for producing an electrolytic capacitor according to claim 1, wherein a boiling point of the coagulant is higher than a boiling point of the first solvent.

3. The method for producing an electrolytic capacitor according to claim 1, wherein the coagulant is aprotic.

4. The method for producing an electrolytic capacitor according to claim 1, wherein the coagulant is a cyclic compound having an oxo group (=O) as a substituent.

5. The method for producing an electrolytic capacitor according to claim 4, wherein the coagulant is at least one selected from the group consisting of a lactone, a cyclic ketone, a lactam, a cyclic carbonate, and a cyclic sulfone.

6. The method for producing an electrolytic capacitor according to claim 1, wherein a mass of the coagulant with which the capacitor element is impregnated is 2 to 100 times a mass of the conductive polymer with which the capacitor element is impregnated.

7. The method for producing an electrolytic capacitor according to claim 1, the method further comprising a fourth step of removing at least a part of the first solvent after the third step.

8. The method for producing an electrolytic capacitor according to claim 1, wherein the first solvent is water, and the capacitor element in which at least water remains is, in the third step, impregnated with the second treatment solution to coagulate the conductive polymer.

9. The method for producing an electrolytic capacitor according to claim 1, the method comprising a fifth step of impregnating the capacitor element with an electrolyte solution after the third step.

10. The method for producing an electrolytic capacitor according to claim 1, wherein the coagulant is lower in affinity for the conductive polymer than the first solvent.

11. A method for producing an electrolytic capacitor, the method comprising:
- a first step of preparing a capacitor element that includes an anode body having a dielectric layer;
- a second step of impregnating the capacitor element with a first treatment solution containing at least a conductive polymer and a liquid solvent including a first solvent; and
- a third step of impregnating, after the second step, the capacitor element, in which at least a part of the first solvent remains, with a second treatment solution containing a coagulant to coagulate the conductive polymer,
- wherein the coagulant is at least one selected from the group consisting of a cyclic ketone and a cyclic sulfone.

12. The method for producing an electrolytic capacitor according to claim 11, wherein a boiling point of the coagulant is higher than a boiling point of the first solvent.

13. The method for producing an electrolytic capacitor according to claim 11, wherein a mass of the coagulant with which the capacitor element is impregnated is 2 to 100 times a mass of the conductive polymer with which the capacitor element is impregnated.

14. The method for producing an electrolytic capacitor according to claim 11, the method further comprising a fourth step of removing at least a part of the first solvent after the third step.

15. The method for producing an electrolytic capacitor according to claim 11, wherein the first solvent is water, and the capacitor element in which at least water remains is, in the third step, impregnated with the second treatment solution to coagulate the conductive polymer.

16. The method for producing an electrolytic capacitor according to claim 11, the method comprising a fifth step of impregnating the capacitor element with an electrolyte solution after the third step.

17. A method for producing an electrolytic capacitor, the method comprising:
- a first step of preparing a capacitor element that includes an anode body having a dielectric layer;
- a second step of impregnating the capacitor element with a first treatment solution containing at least a conductive polymer and a liquid solvent including a first solvent; and
- a third step of impregnating, after the second step, the capacitor element, in which at least a part of the first solvent remains, with a second treatment solution containing a coagulant to coagulate the conductive polymer,
- wherein the coagulant is at least one selected from the group consisting of Diethylene glycol dimethyl ether and 1-Butanol.

18. The method for producing an electrolytic capacitor according to claim 17, wherein a mass of the coagulant with which the capacitor element is impregnated is 2 to 100 times a mass of the conductive polymer with which the capacitor element is impregnated.

19. The method for producing an electrolytic capacitor according to claim 17, the method further comprising a fourth step of removing at least a part of the first solvent after the third step.

20. The method for producing an electrolytic capacitor according to claim 17, wherein the first solvent is water, and the capacitor element in which at least water remains is, in the third step, impregnated with the second treatment solution to coagulate the conductive polymer.

21. The method for producing an electrolytic capacitor according to claim 17, the method comprising a fifth step of impregnating the capacitor element with an electrolyte solution after the third step.

* * * * *